United States Patent
Castro et al.

(10) Patent No.: US 9,922,020 B2
(45) Date of Patent: Mar. 20, 2018

(54) PROVIDING CONTENT USING DYNAMIC ACTION TEMPLATES

(71) Applicant: International Business Machines Corporation, Armonk, NY (US)

(72) Inventors: Paul C. Castro, Sharon, MA (US); Yun-Wu Huang, Chappaqua, NY (US)

(73) Assignee: International Business Machines Corporation, Armonk, NY (US)

(*) Notice: Subject to any disclaimer, the term of this patent is extended or adjusted under 35 U.S.C. 154(b) by 567 days.

(21) Appl. No.: 13/766,418

(22) Filed: Feb. 13, 2013

(65) Prior Publication Data
US 2014/0229826 A1    Aug. 14, 2014

(51) Int. Cl.
*G06F 17/21* (2006.01)
*G06F 17/24* (2006.01)

(52) U.S. Cl.
CPC .................. *G06F 17/248* (2013.01)

(58) Field of Classification Search
CPC .............................. G06F 17/21; G06F 17/212
USPC ....................................................... 715/273
See application file for complete search history.

(56) References Cited

U.S. PATENT DOCUMENTS

| | | | |
|---|---|---|---|
| 5,425,077 A | 6/1995 | Tsoi | |
| 5,986,654 A | 11/1999 | Alexander et al. | |
| 6,055,522 A * | 4/2000 | Krishna et al. | 715/205 |
| 6,182,116 B1 | 1/2001 | Namma et al. | |
| 7,176,943 B2 | 2/2007 | Meyers et al. | |
| 7,404,148 B2 | 7/2008 | Lincke et al. | |
| 7,451,393 B1 * | 11/2008 | Herbison et al. | 715/234 |
| 7,843,464 B2 | 11/2010 | Fisher et al. | |
| 7,844,909 B2 | 11/2010 | Aggarwal et al. | |
| 2002/0087562 A1 * | 7/2002 | McAnaney | G06Q 10/10 |
| 2003/0106022 A1 * | 6/2003 | Goodacre et al. | 715/513 |
| 2004/0205653 A1 * | 10/2004 | Hadfield | G06Q 10/10 715/255 |
| 2006/0143182 A1 * | 6/2006 | Meadows | 707/10 |
| 2006/0150088 A1 * | 7/2006 | Kraft et al. | 715/517 |
| 2007/0240037 A1 * | 10/2007 | Law-How-Hung et al. | 715/513 |
| 2007/0244748 A1 * | 10/2007 | Smith et al. | 705/14 |
| 2007/0245227 A1 * | 10/2007 | Hyland et al. | 715/505 |
| 2007/0271502 A1 * | 11/2007 | Bedi | G06F 17/248 715/230 |
| 2007/0276715 A1 * | 11/2007 | Beringer et al. | 705/7 |
| 2008/0059539 A1 * | 3/2008 | Chin | G06Q 10/10 |
| 2008/0134018 A1 * | 6/2008 | Kembel et al. | 715/234 |

(Continued)

OTHER PUBLICATIONS

J. Santos et al., "Instrumentation Remote Control Through Internet with PHP," IEEE Conference on Virtual Environments, Human-Computer Interfaces, and Measurement Systems (VECIMS), Jul. 2008, pp. 41-44, Istanbul, Turkey.

(Continued)

*Primary Examiner* — Scott Baderman
*Assistant Examiner* — Sookil Lee
(74) *Attorney, Agent, or Firm* — Yeen Tham; Ryan, Mason & Lewis, LLP (57) ABSTRACT

Systems and methods for providing content using dynamic action templates are provided. A method for providing content to at least one user, comprises corresponding at least one action to at least one action template, associating the content with the at least one action, and presenting the content to the at least one user, wherein the at least one action template is appended to the content.

7 Claims, 9 Drawing Sheets

(56) References Cited

U.S. PATENT DOCUMENTS

| | | |
|---|---|---|
| 2008/0154935 A1* | 6/2008 | Draeger et al. ............... 707/102 |
| 2008/0196003 A1* | 8/2008 | Gerken et al. ................ 717/106 |
| 2008/0256429 A1* | 10/2008 | Penner et al. ................ 715/200 |
| 2009/0249193 A1* | 10/2009 | Hanechak ..................... 715/235 |
| 2009/0307298 A1 | 12/2009 | Jaiswal et al. |
| 2010/0192060 A1* | 7/2010 | Stern ...................... G06Q 10/00 |
| | | 715/256 |
| 2011/0022947 A1* | 1/2011 | Rajkumar et al. ............ 715/235 |
| 2011/0264711 A1* | 10/2011 | Thang ........................... 707/812 |
| 2011/0271201 A1* | 11/2011 | Cavagnari ............. G06Q 10/10 |
| | | 715/751 |
| 2011/0283177 A1* | 11/2011 | Gates ................... G06F 17/243 |
| | | 715/224 |
| 2012/0216115 A1* | 8/2012 | Lorenceau ................... 715/704 |
| 2012/0284245 A1* | 11/2012 | Portnoy et al. .............. 707/706 |
| 2013/0191720 A1 | 7/2013 | Simons et al. |
| 2013/0212487 A1* | 8/2013 | Cote ............................ 715/745 |
| 2014/0033068 A1* | 1/2014 | Gupta .................. G06Q 10/103 |
| | | 715/751 |
| 2014/0047330 A1* | 2/2014 | Yan ........................ G06F 3/0486 |
| | | 715/273 |
| 2014/0068549 A1* | 3/2014 | Friedman et al. ............ 717/104 |
| 2014/0129639 A1* | 5/2014 | Burge ..................... H04L 51/32 |
| | | 709/204 |
| 2014/0317049 A1* | 10/2014 | DeRoller .......... G06F 17/30011 |
| | | 707/608 |

OTHER PUBLICATIONS

D. Salber et al., "Ubiquitous Computing: Defining an HCI Research Agenda for an Emerging Interaction Paradigm," GVU Technical Report GIT-GVU-98-01, Feb. 1998, 11 pages.

A.R. Mathur, "The Virtual Molecule Viewer," Department of Computer Science, The University of Sheffield, COM3010, May 2004, pp. 1-61.

* cited by examiner

PROVIDING CONTENT USING DYNAMIC ACTION TEMPLATES

TECHNICAL FIELD

The field generally relates to systems and methods for providing content to at least one user and, in particular, to systems and methods for providing content using dynamic action templates.

BACKGROUND

A known pattern in a software client system is to display some content (e.g., a web page or other document) and then interact with the user. The user can then activate some graphic controls (e.g., a menu item, a button) to trigger a new action, such as navigating to another web page. Known approaches for associating actions with content include programmatically embedding actions, such as using graphical user interface (GUI) language primitives to add buttons or menu items showing the content, or using a known format, such as hyperlinks to embedded actions with pre-defined behaviors.

For example, assuming GUI content containing a description of some merchandise was displayed with a "Where to buy" menu item yesterday, and is now displayed with a "Where to Return" menu item today if a recall of this merchandise happened since yesterday, a known approach requires rewriting the GUI of this content to reflect the change.

Currently, there is no way to dynamically associate different sets of actions with the same content under different situations without employing a complex programming effort.

SUMMARY

In general, exemplary embodiments of the invention include systems and methods for providing content to at least one user and, in particular, to systems and methods for providing content using dynamic action templates.

According to an exemplary embodiment of the present invention, a system for providing content to at least one user comprises a management module capable of corresponding at least one action to at least one action template, associating the content with the at least one action, and appending the at least one action template to the content, and a choreograph engine routing the content including the at least one action template appended thereto to an electronic device of the at least one user.

According to an exemplary embodiment of the present invention, a method for providing content to at least one user, comprises corresponding at least one action to at least one action template, associating the content with the at least one action, and presenting the content to the at least one user, wherein the at least one action template is appended to the content.

According to an exemplary embodiment of the present invention, an article of manufacture comprises a computer readable storage medium comprising program code tangibly embodied thereon, which when executed by a computer, performs method steps for providing content to at least one user, the method steps comprising corresponding at least one action to at least one action template, associating the content with the at least one action, and presenting the content to the at least one user, wherein the at least one action template is appended to the content These and other exemplary embodiments of the invention will be described or become apparent from the following detailed description of exemplary embodiments, which is to be read in connection with the accompanying drawings.

BRIEF DESCRIPTION OF THE DRAWINGS

Exemplary embodiments of the present invention will be described below in more detail, with reference to the accompanying drawings, of which.

DETAILED DESCRIPTION OF EXEMPLARY EMBODIMENTS

Exemplary embodiments of the invention will now be discussed in further detail with regard to systems and methods for providing content to at least one user and, in particular, to systems and methods for providing content using dynamic action templates. This invention may, however, be embodied in many different forms and should not be construed as limited to the embodiments set forth herein.

Disclosed are systems and methods for dynamically associating different sets of actions with the same content under different situations without employing a complex programming effort. According to embodiments of the present invention, the content is not changed, and only the dynamic actions associated with the content are reconfigured.

In accordance with embodiments of the present invention, content (e.g., a web page or other document) is associated with a list of actionable tasks (referred to herein as "dynamic actions") that may change when the content is rendered under different circumstances. The dynamic actions, for example, can address business decision making and/or unplanned situations. The unplanned situation can be, for example, a new business challenge or critical business need, such as a recall, new product, need for a press release, etc. The new business challenge or critical business need may be the result of a news outbreak.

Embodiments of the present invention provide methods and systems for the creation, customization, context association, rendering, execution and/or management of the dynamic actions that need to be incorporated into the content. Using templates, common dynamic actions, e.g., an ask action seeking a response to an inquiry, a rating action seeking a qualitative and/or quantitative rating of content, a goto action requiring some sort of affirmative action or input, an approve action requiring that a planned change or activity be approved, etc. are predefined. For example, according to an embodiment, user seeking to incorporate an ask action into the content can activate an ask action template to be appended to the content, for example, at the end of the content, or accessible via a button or link, e.g., hyperlink, following the content. The template may include, for example, a question and buttons for responses (e.g., "yes", "no", "cancel"), and can be customizable for a user to input the actual question and/or modify the responses to fit the question. In addition, according to an embodiment, the user can specify a location where the response is to be sent, e.g., a destination URL. In this way, the ask action can be added to the content without modifying the content.

According to an embodiment, when a particular content is displayed for a user, a list of dynamic actions is also retrieved. For each dynamic action in the list, a client GUI engine creates a GUI control (e.g., a menu item, button, etc.) for a user to activate or deactivate a dynamic action on the content. When a dynamic action is activated, based on a template type associated with the activated action, the GUI engine renders a particular UI to interact with the user. During this interaction, a user can customize the dynamic action that is to be appended to the content. As a result, according to an embodiment, while the content remains the same from one rendering to another, the list of dynamic actions associated with the content can change based on whether a user activates the dynamic actions.

In accordance with embodiments of the present invention, each dynamic action is associated with a type or category specified by the template. When a dynamic action is activated, a client GUI engine renders the predefined action template. According to an embodiment, in addition to pre-set attributes, each dynamic action template also includes customizable attributes, such as labels and destinations whose values are not part of the templates, but included in a dynamic action list associated with the content to be rendered on the client. For example, as referenced above, according to an embodiment, an action with an "ask" template type can be rendered by a GUI engine showing a question and 3 buttons (e.g., yes, no, and cancel). According to an embodiment, a user managing the addition of dynamic actions to content can customize actual textual values of the question and button labels, and destinations (e.g., URLs) once the buttons are pressed in response to the question. In accordance with an embodiment, dynamic action templates can allow a user to specify a destination (e.g., URL) where results are to be sent after a response is given.

In use in connection with the content, when a dynamic action is invoked, the GUI engine retrieves the customizable information and uses it to render the UI for this action. After a receiving user's interaction with the action UI on the content, the result (e.g., the button that was pressed, the text that was entered, the options that the user chose, etc.) is sent back to the destination URL.

Figure 1:
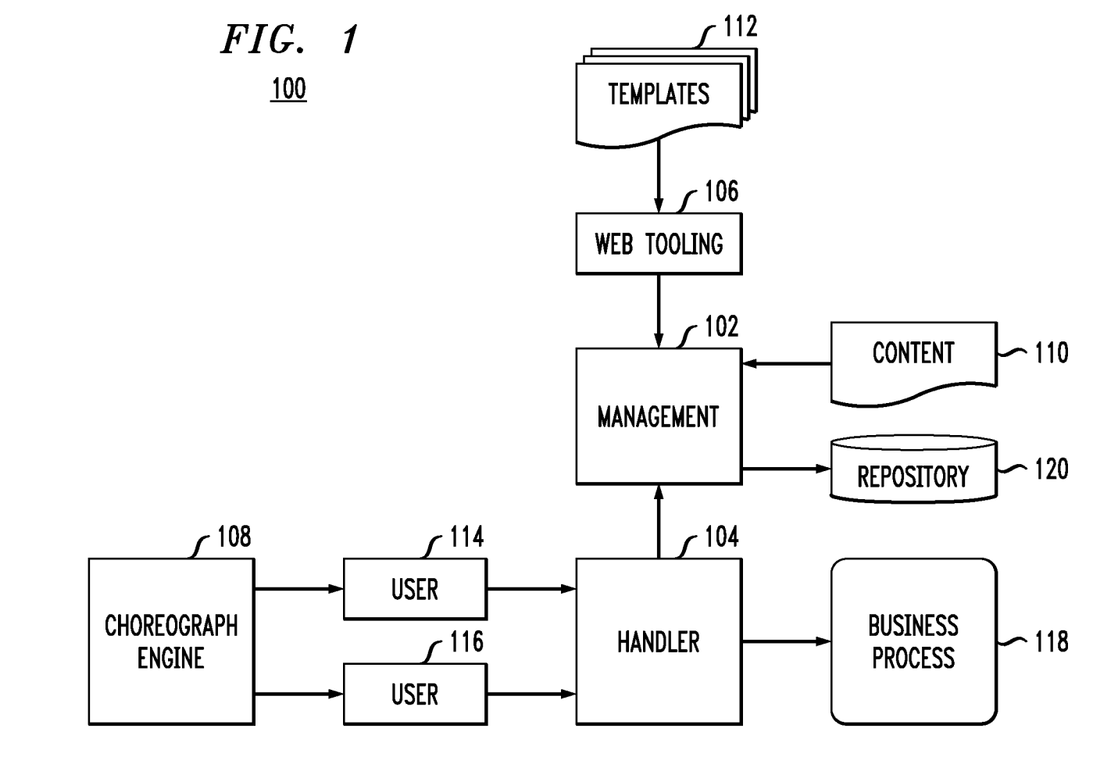
FIG. 1 is a high-level diagram of a system for providing content using dynamic action templates according to an exemplary embodiment of the invention.

Referring to FIG. 1, which is a high-level diagram of a system for providing content using dynamic action templates, according to an exemplary embodiment of the invention, the system includes a management module 102, a handler module 104, a web tooling module 106, and a choreograph engine 108. The system 100 provides a way to send content 110 to a plurality of users such as, for example, browser clients 114 and mobile clients 116. Users may be, for example, members of teams in a business environment. Users can receive the content via a variety of electronic devices, including but not limited to, desktop computers, laptops, mobile phones, such as smartphones, personal digital assistants (PDAs), or any other device capable of receiving and sending electronic communications over a network. The network can include, but is not limited to, for example, a local area network (LAN), wide area network (WAN), cellular network, satellite network and the Internet.

The content 110 includes, for example, web pages, spreadsheets, text documents, such as, for example, memorandums, reports, etc. By attaching the templates 112 to the content 110, new issues and/or actions can be addressed and/or responded to without changing the content prior to sending. The addition of the templates provides a way to solicit responses from the users in connection with issues and/or actions corresponding to the content without changing the content. As a result, reaching a user that is required to take action in connection with particular content can be performed quickly and efficiently by using the action templates, which eliminate the need to modify, restructure and/or reprogram the content.

According to an embodiment, different users can receive the same content with different action templates depending on their roles, job descriptions, powers and/or authorizations. The choreograph engine 108 centrally controls routing of the content 110 with appropriately activated templates to the proper users who are capable of performing different tasks and providing different responses. The choreograph engine 108 can be programmed by a user managing the solicitation of responses from the different users to reach the proper users in a proper order/workflow. For example, in a first step of a workflow, a manager of a team may be able to indicate approval of certain content using an approval template. When the handler module 104 receives the response from the manager, the response can be sent to the management module 102 to further process the content for the next step in the workflow by, for example, appending a different template to the same content for sending to another team member. The choreograph engine 108 receives the further processed content from the management module and dispatches the content and corresponding templates to appropriate team members in the next step of the workflow. For example, once content is approved, the content gets to next team member, who is notified of the approval and informed of a request for further action via a different template, such as, for example, a rating or feedback template. Therefore, at any given point during the workflow process, the same content may be associated with a different template depending on the stage within the workflow and depending on the audience. The choreograph engine 108 can include a document optimization system, such as, for example, the DOCROVER system. As an alternative, or as a supplement to the choreograph engine 108, a message included with the content sent to a user can direct users to use specific templates and forward the content to other users who may need to fill in different templates.

The management module 102 manages the contents 110 and stores the contents in the repository 120, where the contents 110 are ready for use. The management module 102 also manages the templates 112, and can retrieve the contents 110 and templates 112 in response to a request to retrieve from a user incorporating templates to accompany certain content 110. For example, through the management module 102, a user can activate one or more dynamic actions to be associated with certain content, and the management module 102 is programmed to correspond the dynamic actions with respective action templates so that when the user activates a dynamic action from a list of dynamic actions, the management module processes the activation and presents the corresponding action template to the user for customization via a user interface. The user can use the web tools from the web tooling module 106 to customize certain templates 112 for chosen content 110. The management module 102 appends the template(s) to the chosen content 110, and the chosen content 110 with the accompanying template(s) 112 is sent from the management module 102 to the repository 120 for storage or from the management module 102 to the choreograph engine 108 for deployment and delivery to users 114, 116.

The handler module 104 receives users' 114, 116 responses inputted via the templates and having the knowledge of where the responses are to be sent, forwards the responses to an appropriate destination to trigger a business process 118 or to the management module 102 for further processing. According to an embodiment of the present invention, the knowledge of where the responses are to be sent can be input to the handler module 104 by a user directly to the handler module 104, or via the management module 102. A business process 118 can be for example, competitor information gathering, publicity tasks, exception handling, budgeting, product management, etc.

Figure 2:
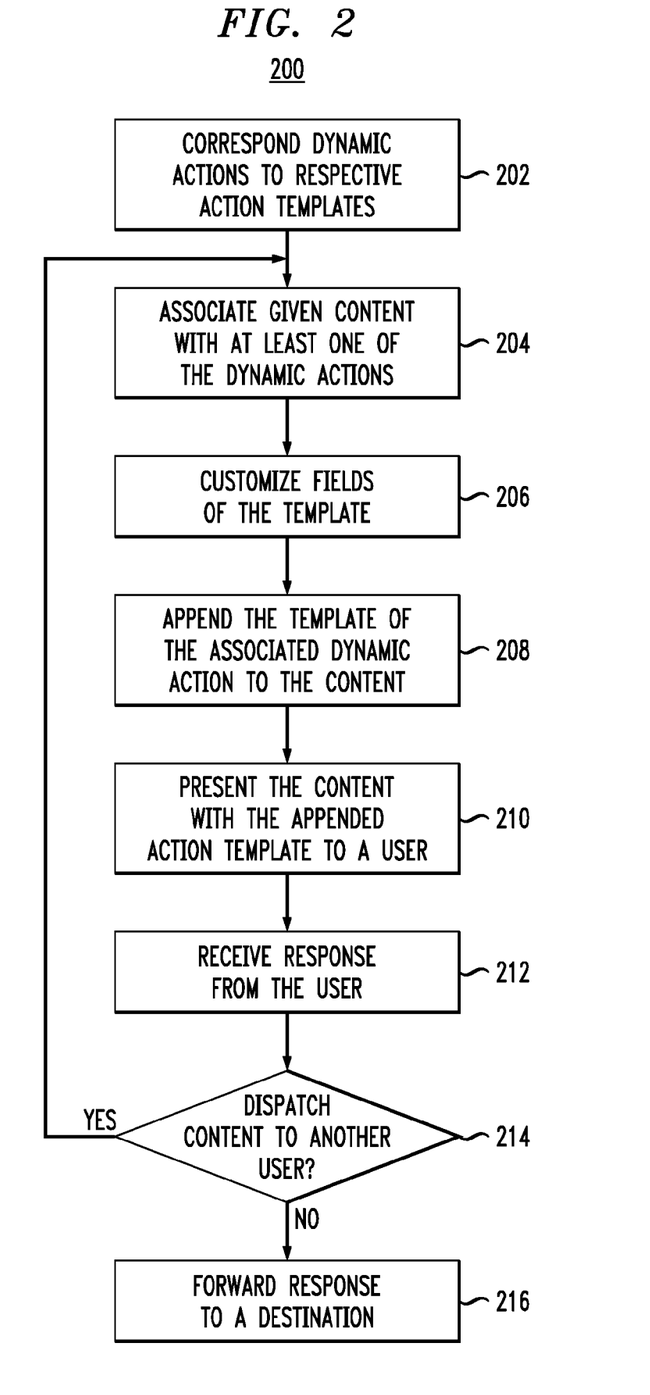
FIG. 2 is a flow diagram of a method for providing content using dynamic action templates according to an exemplary embodiment of the invention.

Referring to FIG. 2, which is a flow diagram of a method for providing content using dynamic action templates according to an exemplary embodiment of the invention, the method includes corresponding dynamic actions to respective action templates (block 202), associating a given content with at least one of the dynamic actions (block 204), appending the action template of the associated dynamic action to the content (block 208), and presenting the content with the appended action template to a user (block 210). According to an embodiment, associating the content with at least one of the dynamic actions includes activating the dynamic action from a plurality of actions. It is noted that as a situation warrants, (e.g., depending on the roles and functions of a user receiving the content), more than one dynamic action can be associated with the content, so that more than one template may be attached to content sent to a particular user.

According to an embodiment, presenting can comprise displaying the content and the action template on a screen of an electronic device of a user capable of receiving and sending electronic communications over a network. Prior to appending the action template to the content, a user managing delivery of the content has the option of customizing fields of the template (206), the fields including, but not limited to, labels and destinations whose values are not part of the templates. The labels may include specific questions and possible responses to the questions presented to a user, and the destination may be a location (e.g., URL) where a response from the user inputted via the action template is to be sent.

A response is solicited from the user via the action template, and the method further includes receiving the response from the user (block 212). Once the response is received from the user, it is determined whether the content is to be dispatched to another user (block 214). If yes, the process returns to step 204, where the content is then associated with a different one of the dynamic actions, the action template of the different associated dynamic action is appended to the content, and the content with the newly appended action template is presented to the other user. The content is dispatched to the other user without modifying the content and the new action template appended to the content solicits a different response from the response solicited via the first action template.

If no at block 214, the process continues to block 216 where the response is forwarded to a destination (e.g., a destination specified during customization) to trigger a business process. It is to be noted that, in accordance with embodiments of the present invention, responses can also be forwarded to a destination (block 216) even when the content is dispatched to another user (i.e., there is a "yes" response at block 214).

Figure 3A:
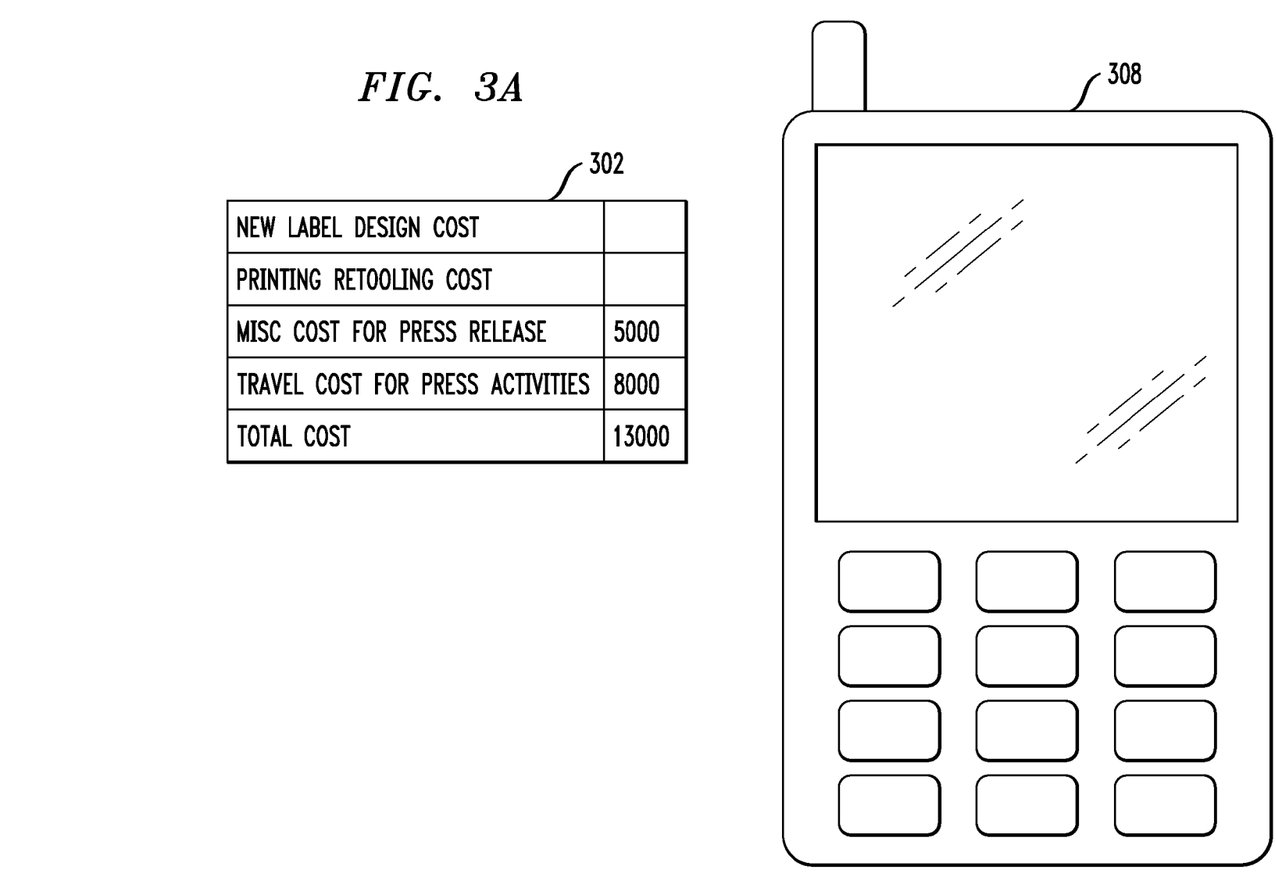
FIGS. 3A-3F are screen shots for illustrating an implementation of an embodiment of the present invention.
Figure 3B:
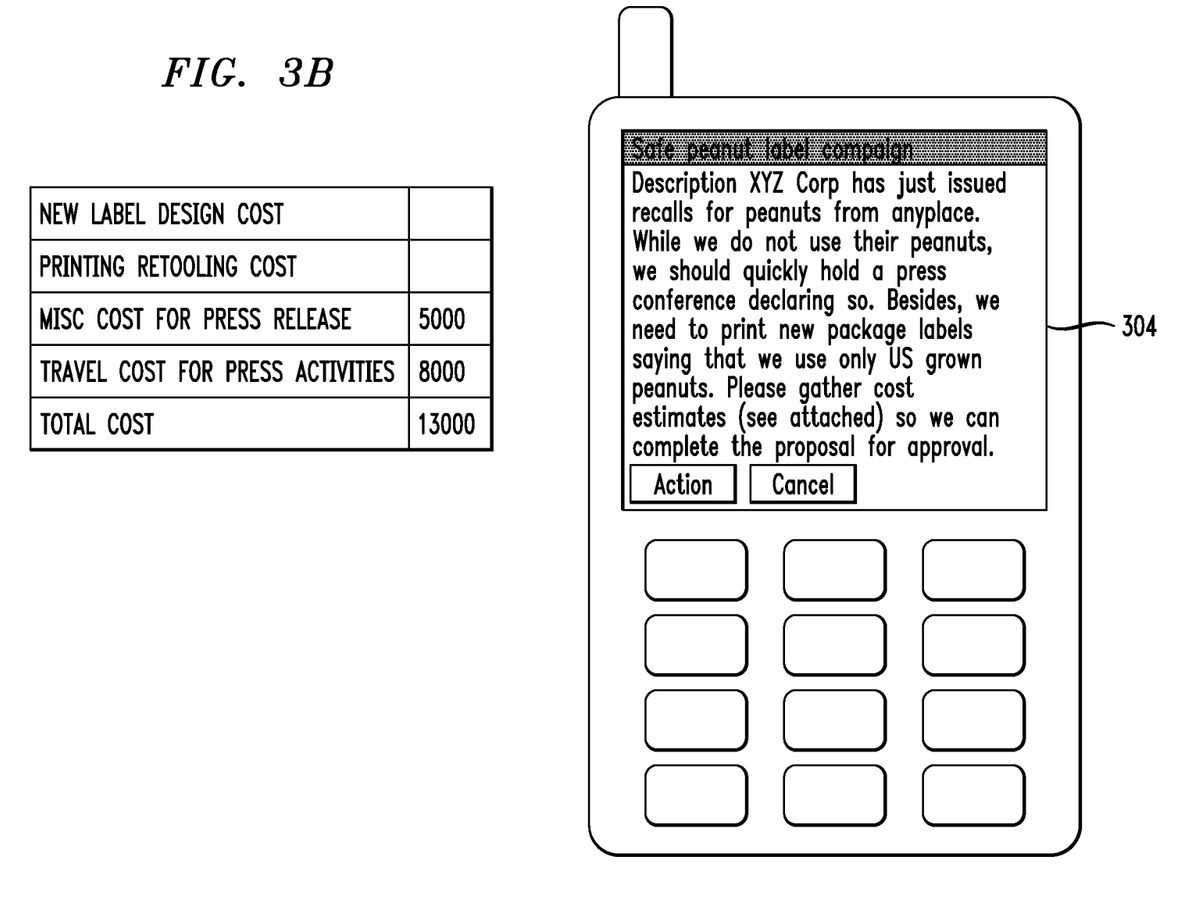
Figure 3C:
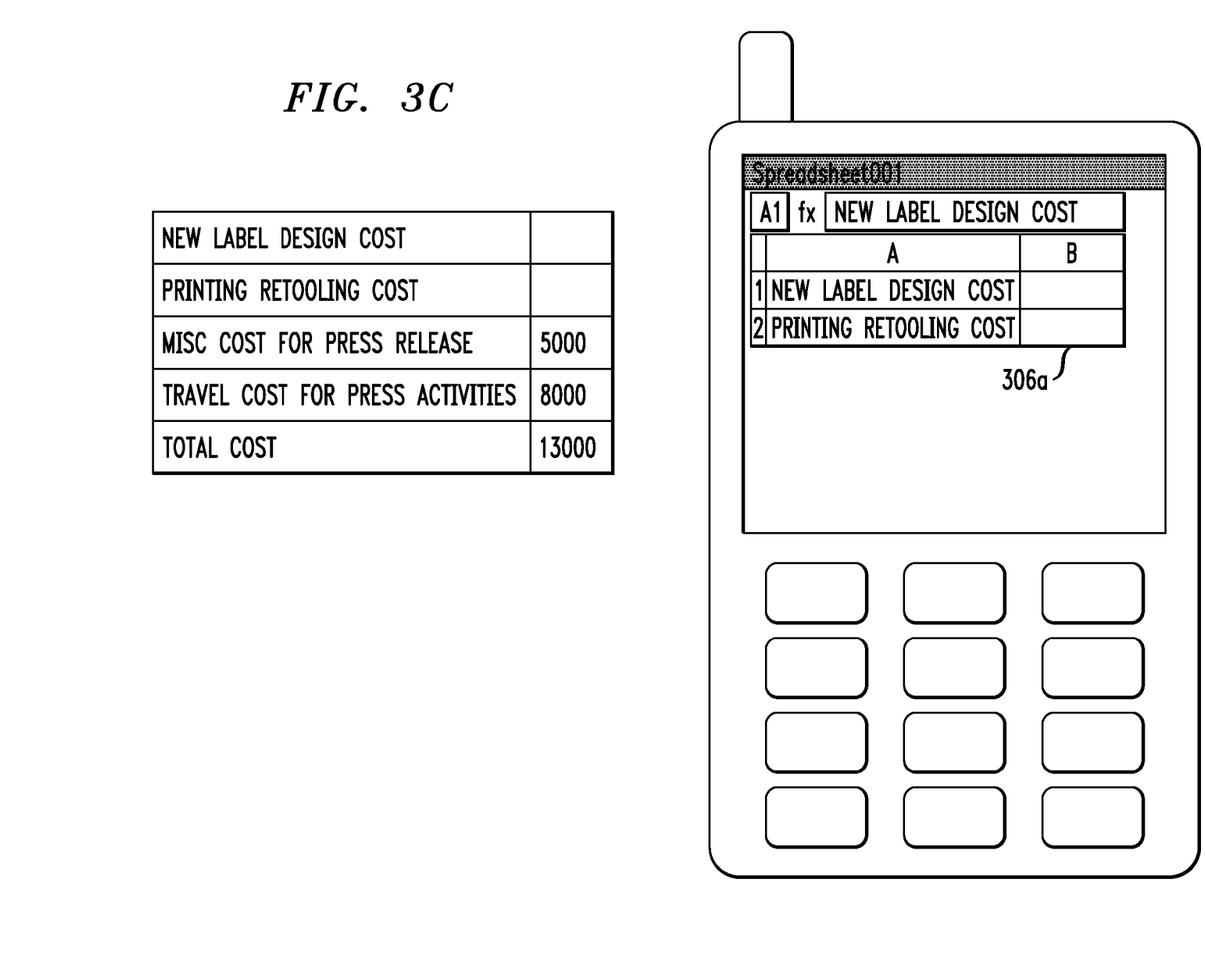
Figure 3D:
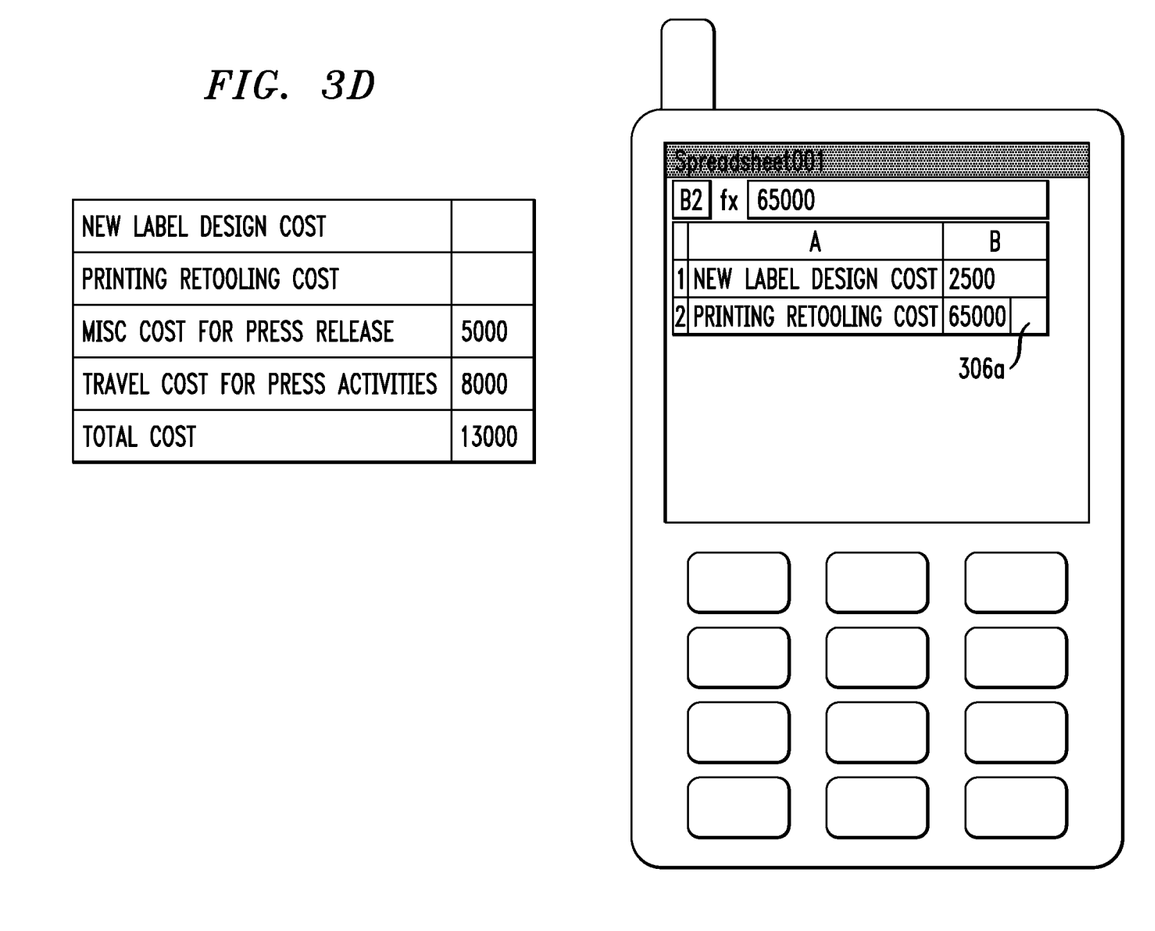
Figure 3E:
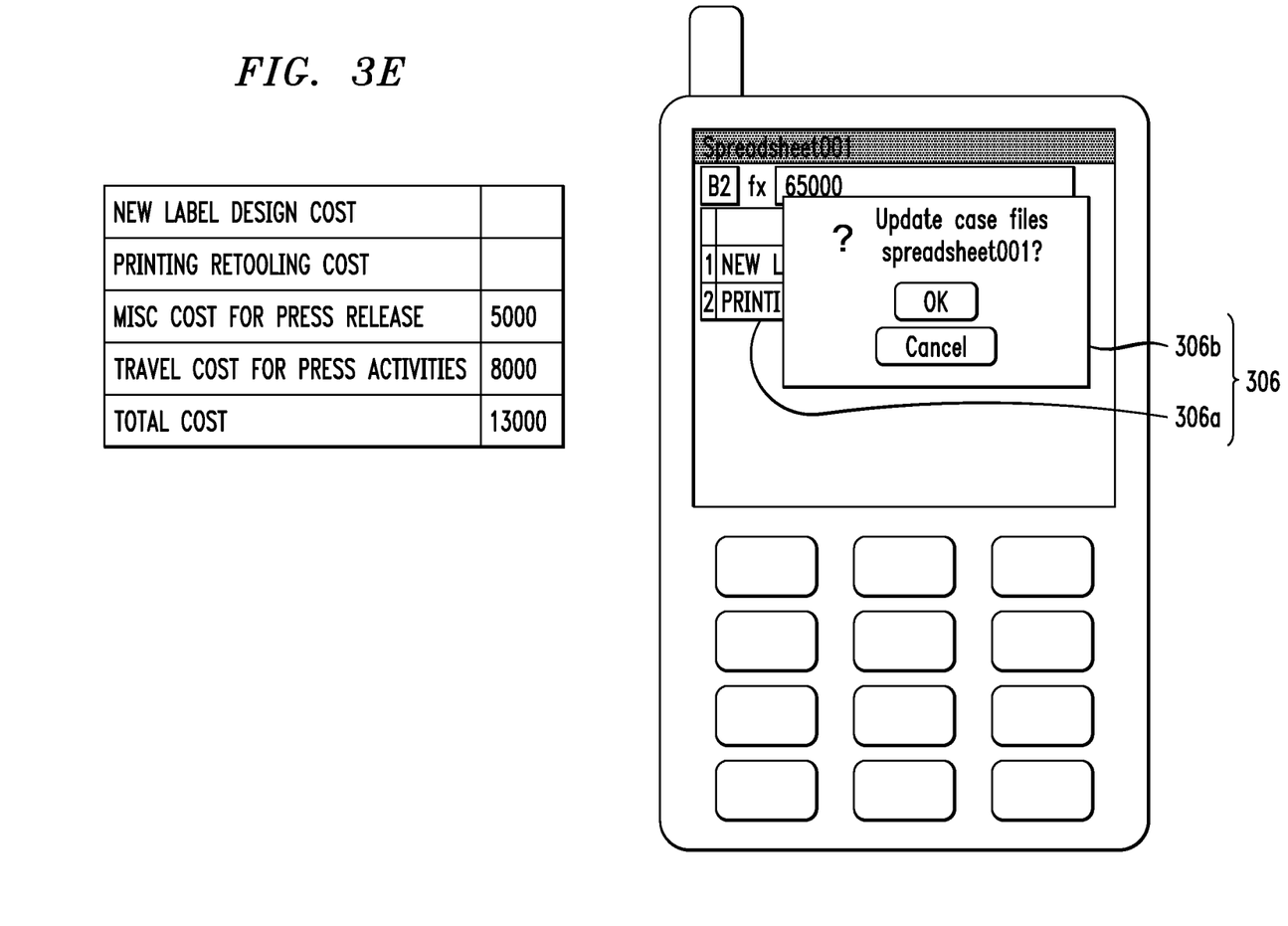
Figure 3F:
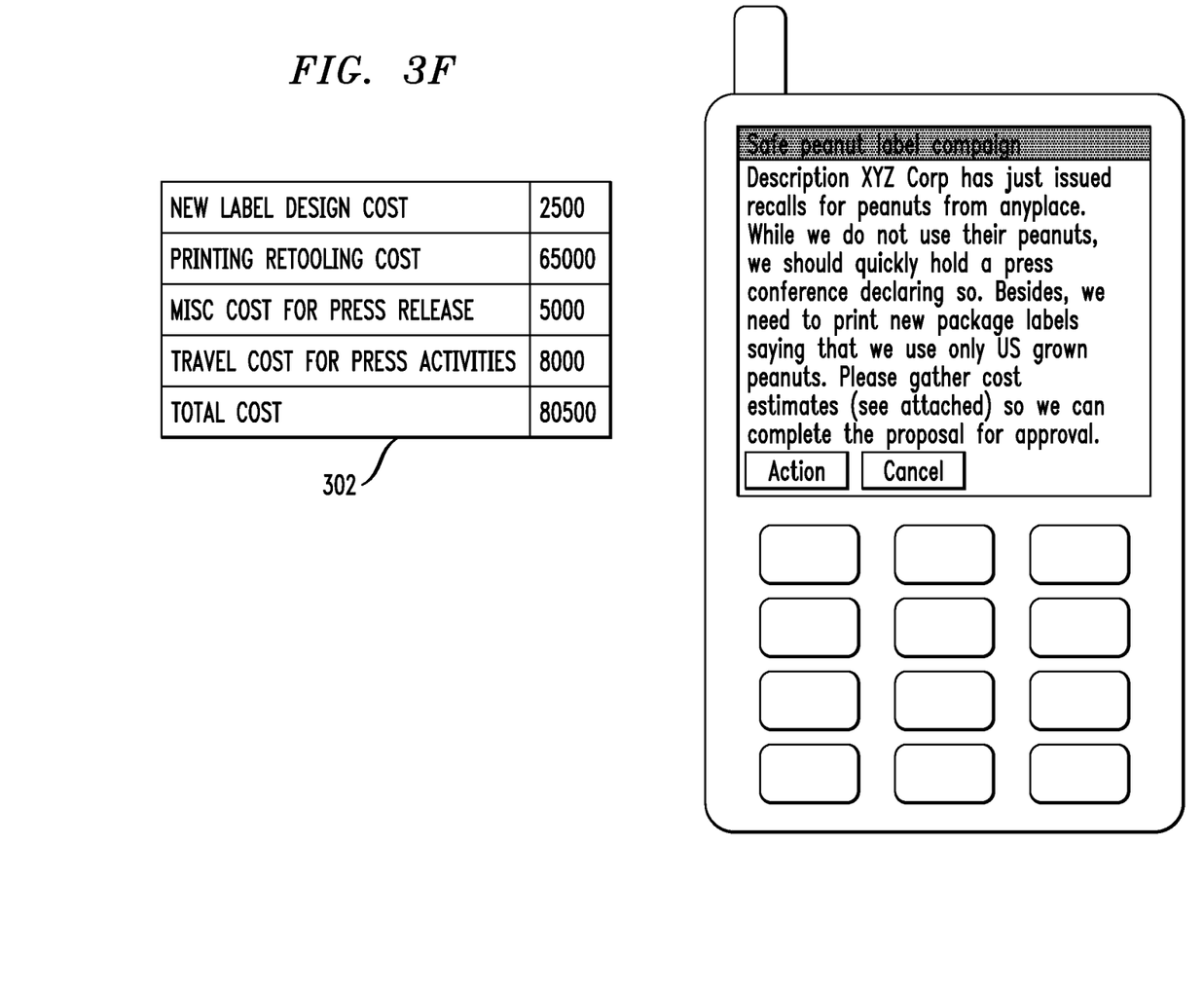

Referring to FIGS. 3A-3F, which are screen shots for illustrating an implementation of an embodiment of the present invention, content 302 is sent to a user, who receives a request for action 304, which in this case is to gather new label design and printing retooling costs for printing new labels in response to a peanut recall. Instead of modifying the content 302 to direct a user to these requests, the user is supplied with an action template 306 through the user's mobile device 308. Using the mobile device 308, referring to FIGS. 3D and 3E, the user can respond to the action request by entering data into the data entry portion 306a (e.g., partial spreadsheet) of the template, and authorizing an update of the content via an approval portion 306b of the template 306. Referring to FIG. 3F, a user can cause content to be updated via the user's mobile device by simply inputting data into and clicking on buttons in a template 306 instead of opening and editing a spreadsheet from the content itself. In this way, a user is not required to update the content via a web-based portal to program a webpage using, for example, html. Although not shown, the user is also able to view the original content 302 on his or her device 308.

Embodiments of the present invention can be implemented outside of the web page framework, using for example, JAVA, C++, Visual Basic, etc.

As will be appreciated by one skilled in the art, aspects of the present invention may be embodied as a system, apparatus, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIGS. 1, 2 and 3A-3F illustrate the architecture, functionality, and operation of possible implementations of systems, methods, and computer program products according to various embodiments of the present invention. In this regard, each block in a flowchart or a block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flowchart illustration, and combinations of blocks in the block diagram and/or flowchart illustration, can be implemented by special purpose hardware-based systems that perform the specified functions or acts, or combinations of special purpose hardware and computer instructions.

Figure 4:
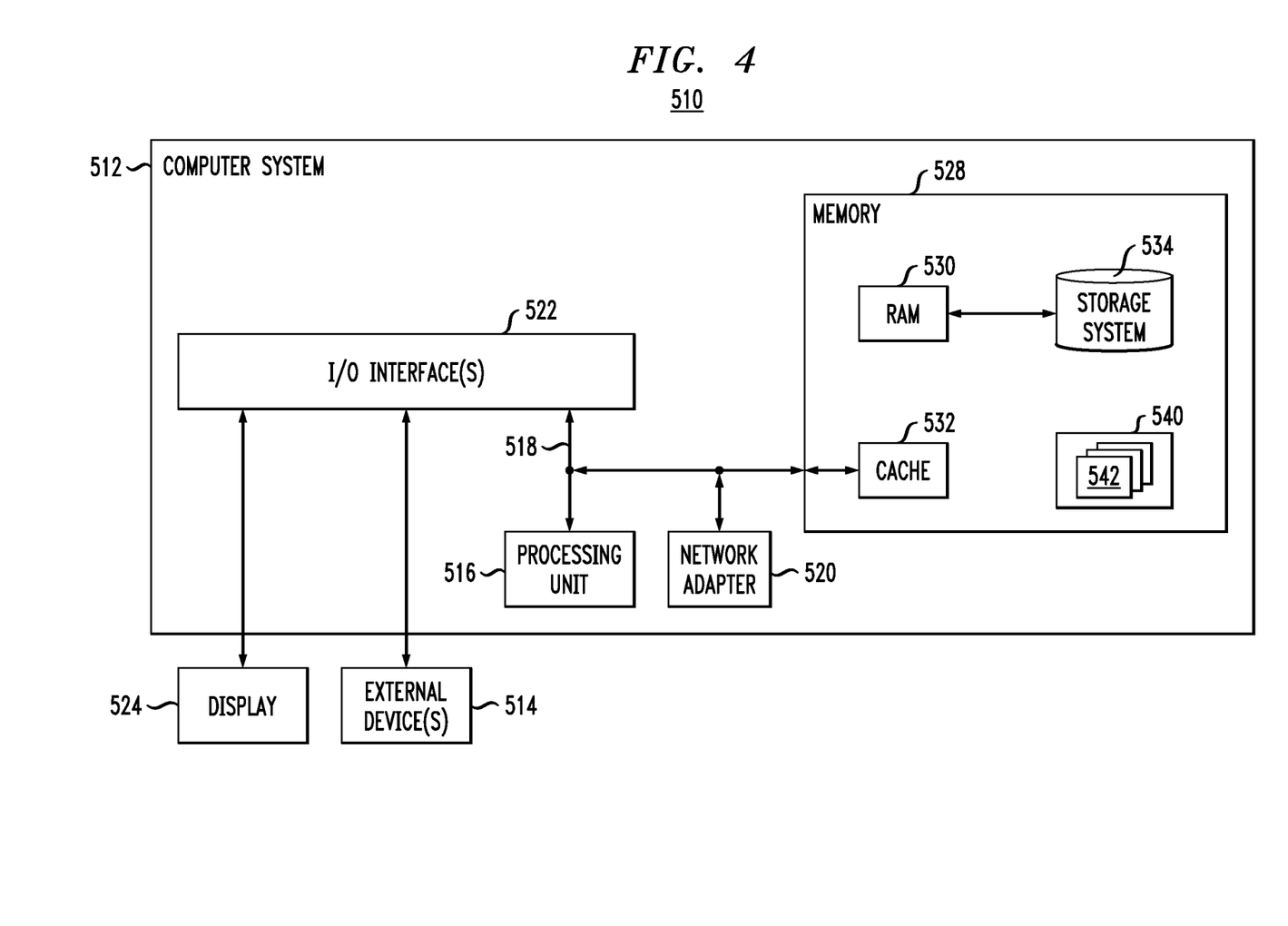
FIG. 4 illustrates a computer system in accordance with which one or more components/steps of the techniques of the invention may be implemented, according to an exemplary embodiment of the invention.

One or more embodiments can make use of software running on a general-purpose computer or workstation. With reference to FIG. 4, in a computing node 510 there is a computer system/server 512, which is operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 512 in computing node 510 is shown in the form of a general-purpose computing device. The components of computer system/server 512 may include, but are not limited to, one or more processors or processing units 516, a system memory 528, and a bus 518 that couples various system components including system memory 528 to processor 516.

The bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 512 typically includes a variety of computer system readable media. Such media may be any available media that is accessible by computer system/server 512, and it includes both volatile and non-volatile media, removable and non-removable media.

The system memory 528 can include computer system readable media in the form of volatile memory, such as random access memory (RAM) 530 and/or cache memory 532. The computer system/server 512 may further include other removable/non-removable, volatile/nonvolatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 518 by one or more data media interfaces. As depicted and described herein, the memory 528 may include at least one program product having a set (e.g., at least one) of program modules that are configured to carry out the functions of embodiments of the invention. A program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or more external devices 514 such as a keyboard, a pointing device, a display 524, etc., one or more devices that enable a user to interact with computer system/server 512, and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples, include, but are not limited to: microcode, device drivers, redundant processing units, external disk drive arrays, RAID systems, tape drives, and data archival storage systems, etc.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

We claim:
1. A method for providing content to at least one user, the method comprising:
displaying the content with a plurality of predetermined actions comprising at least two of an ask action seeking a response to an inquiry, a rating action seeking a rating of the content, an input action requiring an affirmative input, and an approve action requiring approval of a change or activity, wherein which of the plurality of predetermined actions displayed with the content is dynamically altered in response to a change in at least one circumstance requiring an update of the content;
creating a graphical user interface control for each action of the plurality of predetermined actions to be used for activating or deactivating at least one action of the plurality of predetermined actions;
corresponding the at least one action to at least one action template;
associating the content with the at least one action, wherein the associating comprises activating the at least one action via a corresponding graphical user interface control for the at least one action without modifying the content;
rendering a user interface based on the at least one action template for customizing the at least one action template upon activating the at least one action;
wherein the customizing comprises specifying one or more response labels based on one or more inquiries in the at least one action template, and specifying a destination where one or more responses to the one or more inquiries in the at least one action template are to be transmitted;
presenting the content to the at least one user, wherein the at least one action template is appended to the content without modifying the content;
soliciting a first response from the at least one user via the at least one action template;
wherein the at least one action template comprises a replicated portion of the content which is edited by the at least one user without the at least one user accessing and modifying the content, and the edited replicated portion is transmitted from a device of the at least one user as at least part of the first response;
receiving the first response from the at least one user;
dispatching and presenting the content to at least one other user without modifying the content so that the content dispatched to the at least one other user is the same as the content presented to the at least one user, wherein:
at least one other action template different from the at least one action template is appended to the content dispatched to the at least one other user;
the at least one other action template solicits a second response from the at least one other user different from the first response; and
a selection of the at least one other action template is based on a stage within a workflow, and one or more details about the at least one other user;
receiving the second response from the at least one other user;
forwarding the first and second responses to the destination to trigger a process based at least in part on the first and second responses, wherein the forwarding comprises automatically determining the destination based on a knowledge sent from the management module which specifies the destination that will trigger the process based on the first and second responses, and wherein the first and second responses are forwarded to the destination while dispatching the content to one or more other users;
wherein the content is stored in a file; and
updating the content in the file, wherein the updating is performed exclusively via the at least one action template and the at least one other action template to correspond the content to the first and second responses, wherein the updating is performed without any user, including the at least one user and the at least one other user, opening the file including the content.

2. The method of claim 1, wherein the content includes at least one of a webpage, a textual document or a spreadsheet.

3. The method of claim 1, wherein the step of presenting comprises displaying the content and the at least one action template on a screen of a device capable of receiving and sending electronic communications over a network.

4. The method of claim 1, further comprising presenting the content to the at least one other user without the at least one action template.

5. The method of claim 1, further comprising authorizing the updating of the content in the file via respective approval portions of the at least one action template and the at least one other action template.

6. The method of claim 1, wherein the selection of the at least one other action template based on the stage within a workflow comprises:
   determining that the first response indicates approval of the content by the at least one user; and
   selecting the at least one other action template, wherein the at least one other action template comprises a request for further action by the at least one other user based on the approval of the content.

7. The method of claim 1, wherein the process comprises at least one of competitor information gathering, a publicity task, exception handling, budgeting and product management.

* * * * *